(12) United States Patent
Burdette

(10) Patent No.: US 8,141,388 B2
(45) Date of Patent: Mar. 27, 2012

(54) RADIATION COLLIMATOR FOR INFRARED HEATING AND/OR COOLING OF A MOVING GLASS SHEET

(75) Inventor: Steven R. Burdette, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/787,737

(22) Filed: May 26, 2010

(65) Prior Publication Data

US 2011/0289967 A1    Dec. 1, 2011

(51) Int. Cl.
*C03B 17/00* (2006.01)
(52) U.S. Cl. ............................. 65/90; 65/268
(58) Field of Classification Search ............... 65/90, 95, 65/97, 194, 348, 349, 193
See application file for complete search history.

(56) References Cited

U.S. PATENT DOCUMENTS

| | | | | |
|---|---|---|---|---|
| 3,275,820 A | | 9/1966 | Szarkowski | 240/46.31 |
| 3,619,159 A | * | 11/1971 | Shirley | 65/162 |
| 3,634,058 A | * | 1/1972 | Yunker | 65/196 |
| 3,697,758 A | | 10/1972 | Binks | 250/202 |
| 3,773,487 A | * | 11/1973 | Plumat et al. | 65/30.14 |
| 4,334,524 A | | 6/1982 | McCullough et al. | 126/449 |
| 4,949,704 A | | 8/1990 | Pfluger | 126/441 |
| 5,931,157 A | | 8/1999 | Aschauer | 126/650 |
| 6,258,516 B1 | | 7/2001 | Trokhan et al. | 430/397 |
| 7,250,607 B1 | | 7/2007 | Keck et al. | 250/363.1 |
| 2005/0190562 A1 | * | 9/2005 | Keuper et al. | 362/325 |
| 2009/0226733 A1 | * | 9/2009 | Kato et al. | 428/428 |

OTHER PUBLICATIONS

H.O. Anger, et al., "Scintillation Camera with Multichannel Collimators", *Journal of Nuclear Medicine*, vol. 5, 1964, pp. 515-531.
D.W. Cohn, et al., "Comparison of Theory and experiments for reflection from microcontoured surfaces", *Int. J. Heat Mass Transfer*, 1997, vol. 40, No. 13, pp. 3223-3235.
J.E.Y. Hum, et al, "Analytical model for the thermal conductance of double-compound honeycomb transparent insulation, with validation", *Solar Energy*, 2004, vol. 76, pp. 85-91.
E.L. Keller, "Optimum Dimensions of Parallel-Hole, Multi-Aperture Collimators for Gamma-Ray Cameras", *Journal of Nuclear Medicine*, 1968, vol. 9, No. 6, pp. 233-235.

* cited by examiner

*Primary Examiner* — Matthew Daniels
*Assistant Examiner* — Yana Belyaev
(74) *Attorney, Agent, or Firm* — Thomas R. Beall

(57) ABSTRACT

A glass manufacturing system and a method are described herein that use an enhanced temperature control device to help manufacture a uniformly thick glass sheet that is substantially stress free. In one example, the enhanced temperature control device includes an array of temperature controlled elements and a radiation collimator which together cool the glass sheet with a high degree of spatial resolution so as to reduce stress in the glass sheet and control the thickness of the glass sheet.

19 Claims, 8 Drawing Sheets

FIG. 3
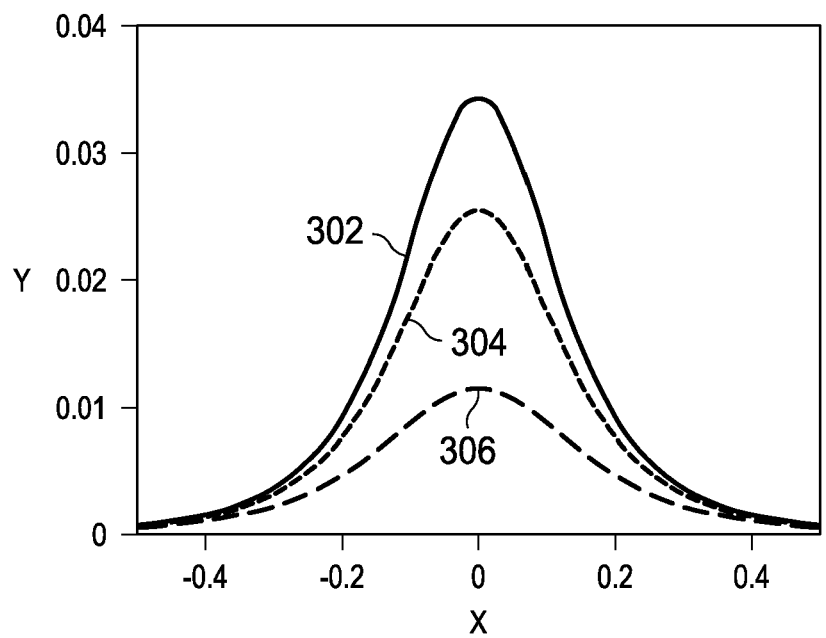
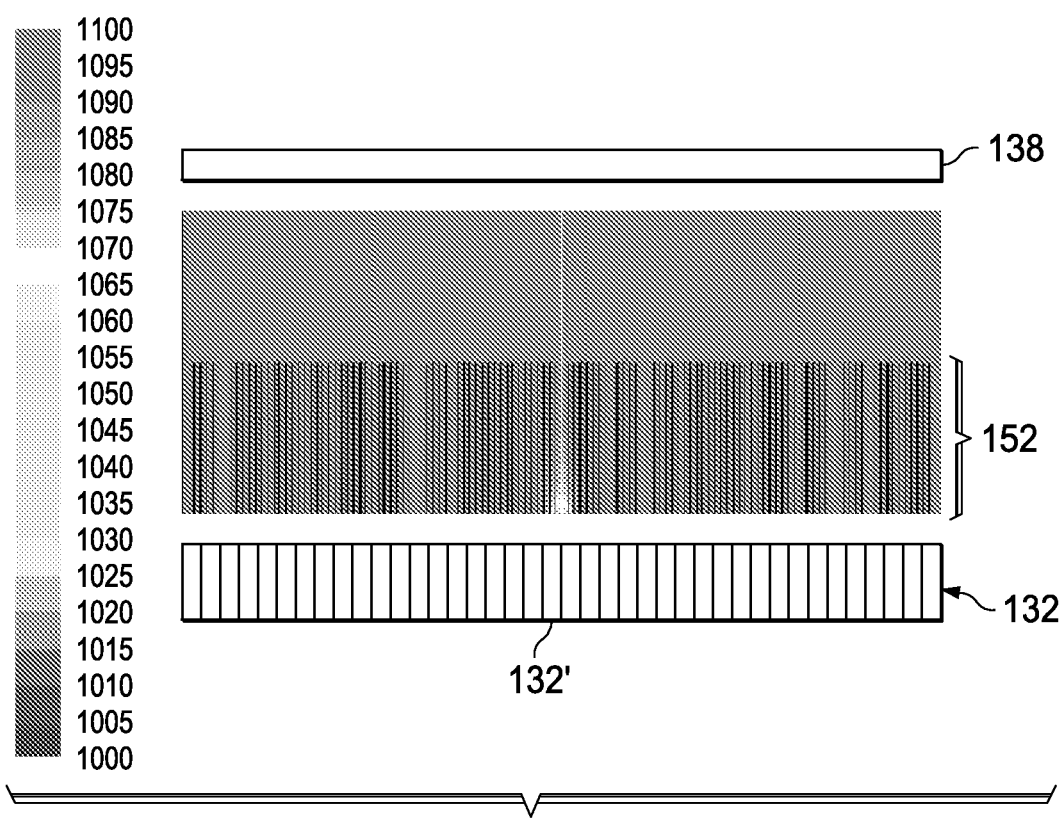
FIG. 5

RADIATION COLLIMATOR FOR INFRARED HEATING AND/OR COOLING OF A MOVING GLASS SHEET

TECHNICAL FIELD

The present invention relates to a glass manufacturing system and a method that utilizes an enhanced temperature control device to help manufacture a uniformly thick glass sheet which is substantially stress free.

BACKGROUND

Manufacturers of glass sheets that can be used in flat panel displays such as liquid crystal displays (LCDs) are constantly trying to enhance the glass manufacturing system to produce glass sheets which are uniformly thick and substantially stress free. One way to enhance the glass manufacturing system to produce such glass sheets is the subject of the present invention.

SUMMARY

A glass manufacturing method, a glass manufacturing system, and an enhanced temperature control device (which includes an array of temperature controlled elements and a radiation collimator) have been described in the independent claims of the present application. Advantageous embodiments of the glass manufacturing method, the glass manufacturing system, and the enhanced temperature control device have been described in the dependent claims.

In one aspect, the present invention provides a glass manufacturing system that includes: (a) at least one vessel configured to provide a molten glass; (b) a forming apparatus configured to receive the molten glass and form a glass sheet; (c) a temperature control device configured to control heating or cooling rates across a width of the glass sheet; (d) a pull roll assembly configured to receive and draw the glass sheet; and (e) a cutting machine configured to cut the glass sheet into individual glass sheets. The temperature control device includes: (i) a controller; (ii) an array of temperature controlled elements which are connected to the controller; and (iii) a radiation collimator positioned between the temperature controlled elements and the glass sheet. In one example, the controller is configured to control the temperature of each temperature controlled element such that the combination of the temperature controlled elements and the radiation collimator together cool or heat different portions of the glass sheet with a high degree of spatial resolution so as to reduce stress in the glass sheet and/or control the thickness of the glass sheet.

In another aspect, the present invention provides a glass manufacturing method that includes the steps of: (a) melting batch materials to form molten glass; (b) processing the molten glass to form the glass sheet; (c) using a temperature control device to control heating or cooling rates across a width of the glass sheet; (d) drawing the glass sheet; and (e) cutting the glass sheet into individual glass sheets. The temperature control device includes: (i) a controller; (ii) an array of temperature controlled elements which are connected to the controller; and (iii) a radiation collimator positioned between the temperature controlled elements and the glass sheet. In one example, the controller is configured to control the temperature of each temperature controlled element such that the combination of the temperature controlled elements and the radiation collimator together cool or heat different portions of the glass sheet with a high degree of spatial resolution so as to reduce stress in the glass sheet and/or control the thickness of the glass sheet.

In yet another aspect, the present invention includes a temperature control device that is configured to control heating or cooling rates across a width of a moving piece of material. The temperature control device includes: (a) a controller; (b) an array of temperature controlled elements which are connected to the controller; and (c) a radiation collimator that is positioned between the array of temperature controlled elements and the moving piece of material. The radiation collimator includes multiple cells where each cell has an open channel in a substantially perpendicular direction relative to the plurality of temperature controlled elements, and each cell has walls that are in a substantially parallel direction relative to the direction of the moving piece of material. In one example, the controller is configured to control the temperature of each temperature controlled element such that the combination of the temperature controlled elements and the radiation collimator together cool or heat different portions of the piece of material with a high degree of spatial resolution.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIG. 3 is a plot of a radiation view factor function $F_i(x,y)$ which is used to help explain a benefit associated with using the enhanced temperature control device;

FIGS. 5-6 are graphs illustrating the results of simulations conducted to test the enhanced temperature control device.

DETAILED DESCRIPTION

Figure 1A:
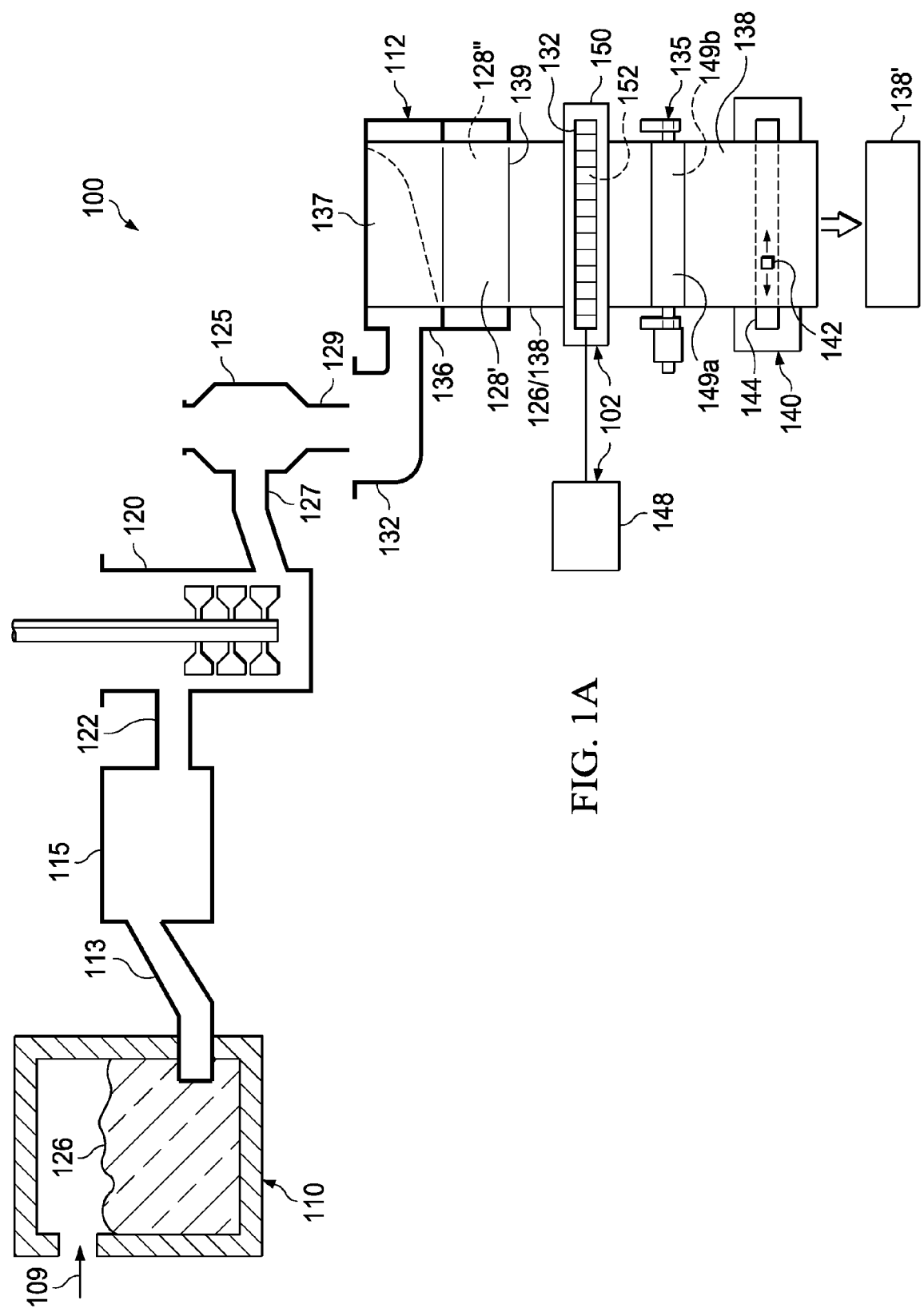
FIG. 1A is a schematic view of an exemplary glass manufacturing system which uses a fusion process and an enhanced temperature control device to manufacture a glass sheet in accordance with an embodiment of the present invention.
Figure 1B:
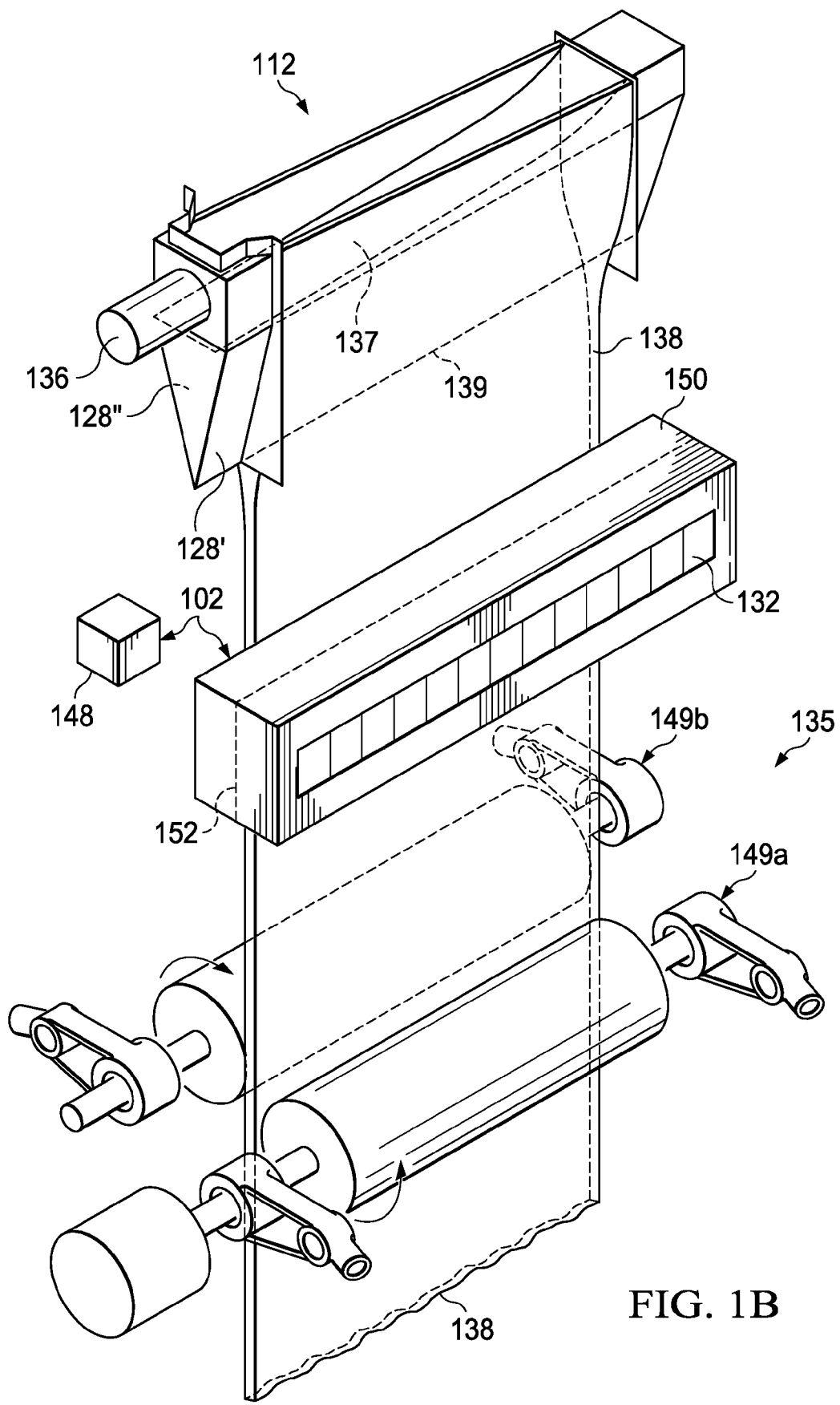
FIG. 1B is a perspective view illustrating a forming apparatus, the enhanced temperature control device, and a pull roll assembly which are part of the glass manufacturing system shown in FIG. 1B.

Referring to FIGS. 1A-1B, there are shown different views of an exemplary glass manufacturing system 100 which uses a fusion process and an enhanced temperature control device 102 to manufacture a glass sheet 138 in accordance with an embodiment of the present invention. Although the glass manufacturing system 100 which is described herein uses a fusion process to make the glass sheet 138, it should be understood that the temperature control device 102 could be incorporated within and used by any type of glass manufacturing system. For example, the temperature control device 102 can be used in combination with a fusion draw, slot draw, down draw, or any other glass sheet forming method which employs a continuous glass sheet forming process. Accordingly, the temperature control device 102 of the present invention should not be construed in a limited manner.

As shown in FIG. 1A, the exemplary glass manufacturing system 100 includes a melting vessel 110, a fining vessel 115, a mixing vessel 120 (e.g., stir chamber 120), a delivery vessel 125 (e.g., bowl 125), a forming apparatus 112 (e.g., isopipe 112), the enhanced temperature control device 102, a pull roll assembly 135, and a glass sheet separation device 140. Typically, the fining vessel 115, the mixing vessel 120 and the delivery vessel 125 are made from platinum or platinum-containing metals such as platinum-rhodium, platinum-iridium and combinations thereof, but they may also comprise other refractory metals such as molybdenum, palladium, rhenium, tantalum, titanium, tungsten, or alloys thereof. The forming apparatus 112 is typically made from zircon.

The melting vessel 110 is where the glass batch materials are introduced as shown by arrow 109 and melted to form molten glass 126. The fining vessel 115 (e.g., finer tube 115) has a high temperature processing area that receives the molten glass 126 (not shown at this point) via a refractory tube 113 from the melting vessel 110 and in which bubbles are removed from the molten glass 126. The fining vessel 115 is connected to the mixing vessel 120 (e.g., stir chamber 120) by a finer to stir chamber connecting tube 122. The mixing vessel 120 is connected to the delivery vessel 125 by a stir chamber to bowl connecting tube 127. The delivery vessel 125 delivers the molten glass 126 through a downcomer 129 to an inlet 132 and into the forming apparatus 112. The forming apparatus 112 includes an inlet 136 that receives the molten glass 126 which flows into a trough 137 and then overflows and runs down two sides 128' and 128" before fusing together at what is known as a root 139. The root 139 is where the two sides 128' and 128" come together and where the two overflow walls of the molten glass 126 rejoin (e.g., refuse) one another to form the downward moving glass sheet 138 (glass ribbon 138).

The temperature control device 102 includes a controller 148 and a frame 150 where the frame 150 supports an array of temperature controlled elements 132 (e.g., resistively heated temperature controlled elements 132) and a radiation collimator 152 (see FIG. 1B). The controller 148 interfaces with controls the temperature of each of the temperature controlled elements 132 such that the combination of the temperature controlled elements 132 and the radiation collimator 152 together cool or heat different portions of the downward moving glass sheet 138 with a high degree of spatial resolution to reduce stress in the glass sheet 138 and to control the thickness of the glass sheet 138 (see FIG. 1B). The frame 150 is attached to a fusion forming machine (not show) in such a way that the array of temperature controlled elements 132 and the radiation collimator 152 extend across the entire width of the downward moving glass sheet 138. A detailed discussion about an exemplary temperature control device 102 is provided below with respect to FIGS. 2-6.

The pull roll assembly 135 has two rolling rolls 149a and 149b which draw there between the downward moving glass sheet 138 (see FIG. 1B). The pull roll assembly 135 also helps to control the thickness of the downward moving glass sheet 138. Then, the glass sheet separation device 140 which may include a mechanical scoring device 142 (e.g., scoring wheel 142) and a nosing device 144 is used to mechanically score the downward moving glass sheet 138 so it can be separated into distinct pieces of glass sheets 138'.

Referring to FIG. 1B, the frame 150 with the temperature controlled elements 132 and the radiation collimator 152 is shown located between the forming apparatus 112 and the pull roll assembly 135. However, the frame 150 with the temperature controlled elements 132 and the radiation collimator 152 could also be located between the pull roll assembly 135 and the glass sheet separation device 140. In fact, there can be multiple frames 150 each with their own array of temperature controlled elements 132 and radiation collimator 152 located at different locations in the glass manufacturing system 100. If desired, one or more frames which contain only an array of temperature controlled elements 132 can be used at one or more locations in the glass manufacturing system 100 to further help control the temperature distribution across the width and length of the downward moving glass sheet 138.

Figure 2A:
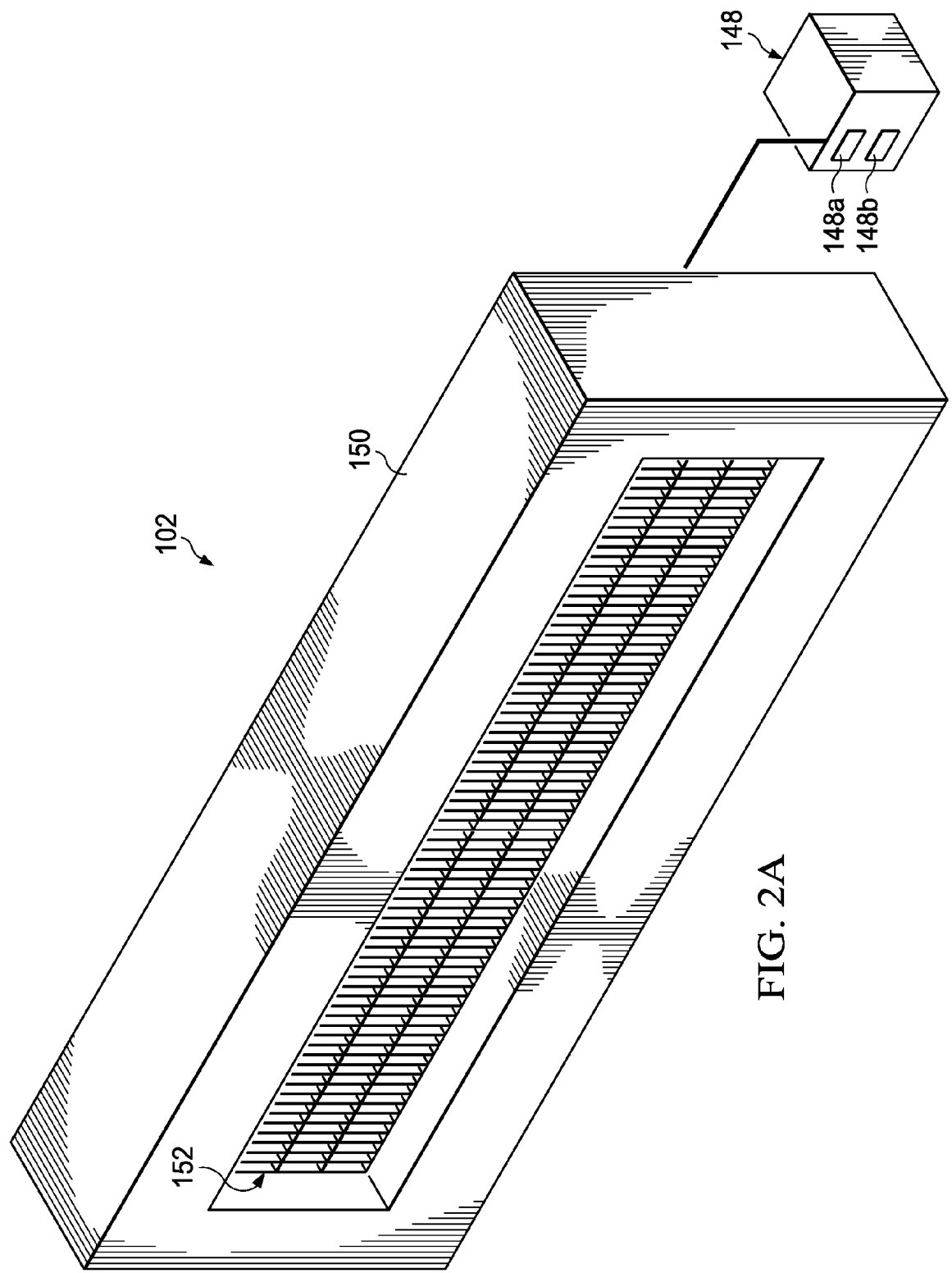
FIGS. 2A-2C are three diagrams which illustrate in greater detail the enhanced temperature control device in accordance with an embodiment of the present invention.
Figure 2B:
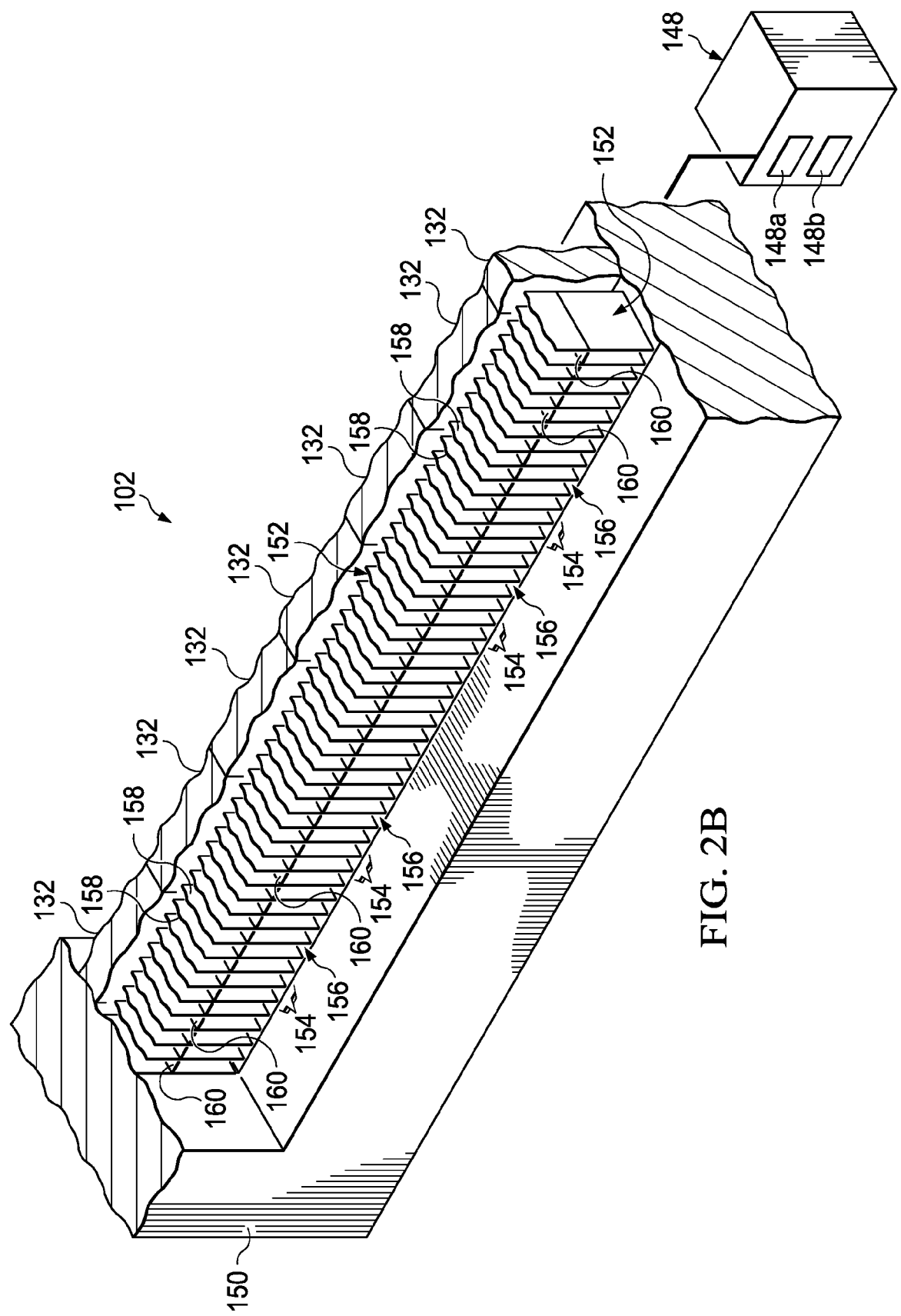
Figure 2C:
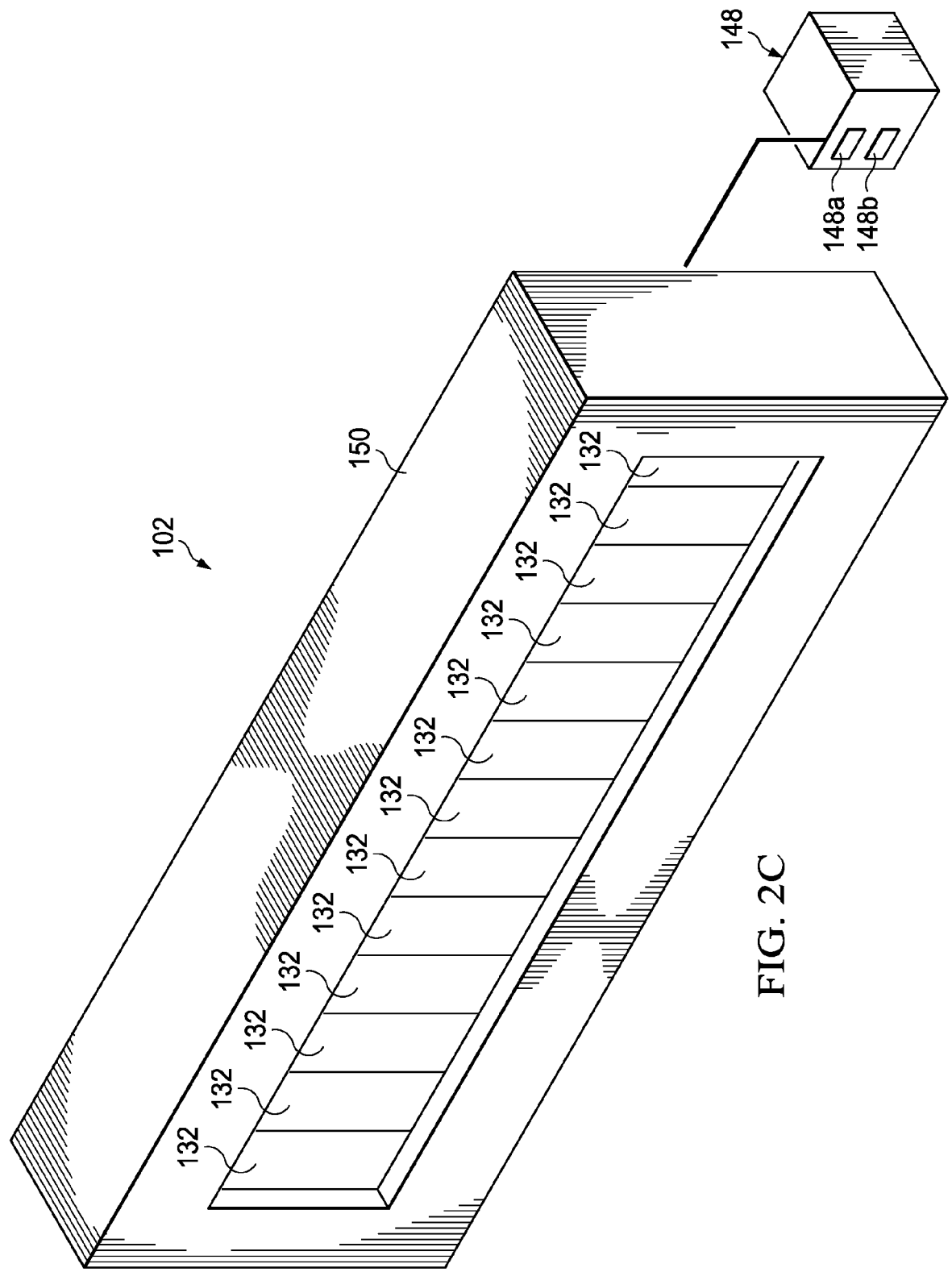

Referring to FIGS. 2A-2C, there are three diagrams which illustrate in greater detail the enhanced temperature control device 102 in accordance with an embodiment of the present invention. The temperature control device 102 includes the controller 148 and the frame 150 which supports the temperature controlled elements 132 and the radiation collimator 152. As shown in FIG. 2B, the temperature controlled elements 132 are lined-up next to one another and the radiation collimator 152 is positioned adjacent to or at least a small distance away from the temperature controlled elements 132. The radiation collimator 152 includes an array of cells 154 where each cell 154 has an open channel 156 in a substantially perpendicular direction (or other direction) relative to the face of the temperature controlled elements 132. Each cell 154 also has walls 158 that are in a substantially parallel direction (or other direction) relative to the movement of the downward moving glass sheet 138 (see FIG. 4). In addition, one or more of the cells 154 can have walls 160 that are in a substantially perpendicular direction (or other direction) relative to the movement of the downward moving glass sheet 138. The walls 160 which are oriented perpendicular to the movement of the glass sheet 138 would increase the spatial resolution in the travel direction of glass sheet 138, which would be desirable if it was beneficial to have high resolution control of the infrared cooling rate or heating rate in the travel direction of glass substrate 138. If desired, the temperature controlled elements 132 can have textured surfaces. In this particular example, the radiation collimator 152 has a 1-100 array of cells 154 which are positioned a small distance away from a 1×13 array of temperature controlled elements 132.

In operation, the controller 148 (e.g., processor 148a and memory 148b) controls the temperature of each of the temperature controlled elements 132 such that the combination of the temperature controlled elements 132 and the radiation collimator 152 are able to accurately control the temperature distribution across the width of the downward moving glass sheet 138. The accurate control of the temperature distribution across the width of the downward moving glass sheet 138 is desirable due to the nature of the fusion forming process where high frequency temperature variations occur in the direction perpendicular to the flow of the glass sheet 138 and those temperature variations cause the finished glass sheet 138 to have bands of varying retardance (stress) which if not taken into account will adversely affect its performance in display applications such as liquid crystal display applications. Thus, the combination of the temperature controlled elements 132 and the radiation collimator 152 by cooling (or heating) the glass sheet 138 with a high degree of spatial resolution can cancel the various temperature variations due to the fusion forming process and enable the production the glass sheets 13 (e.g., LCD glass sheet 138) which have essentially no bands of varying retardance.

The enhanced temperature control device 102 also has a desirable feature where the radiation collimator 152 can be placed a certain distance away from the downward moving glass sheet 138 while still being able to accurately control the temperature distribution across the width of the downward moving glass sheet 138. This is important because in the fusion forming process there should be at least 50 mm of space between the glass sheet 138 and the radiation collimator 152 to allow clearance for the glass sheet 138 during the startup operation and to allow the movement of the glass sheet 138 during normal operations. In this regard, the radiation collimator 152 would be designed such that the space of the open channel 156 and the length of the walls 158 associated with each cell 154 would be sized so that the temperature controlled elements 132 can be used to control the cooling or heating of the downward moving glass sheet 138 to a desired spatial resolution. For instance, the desired spatial resolution which corresponds to the width of a specific section of the glass sheet 138 that can be individually cooled or heated can be about 75 mm, or more preferred about 50 mm, or even more preferred about 20 mm.

A discussion is provided next to explain in greater detail how the enhanced temperature control device 102 and in particular the temperature controlled elements 132 and the radiation collimator 152 can be configured and used to control the cooling (for example) of the moving glass sheet 138 or for that matter any other substrate or other piece of material. First, consider a hot planar glass sheet 138 (e.g., substrate 138) that is moving past a linear array of planar temperature controlled elements 132 without the presence of the radiation collimator 152. Each temperature controlled element 132 may be held at a different temperature to provide differential cooling across the glass sheet 138. The following variables are defined:

W width of the glass sheet 138 perpendicular to the direction of movement $T_s$ temperature of the glass sheet 138, assumed to be constant $w_i$ width of the $i^{th}$ cooling temperature controlled element 132

$T_i$ temperature of the $i^{th}$ cooling temperature controlled element 132 h height of the cooling temperature controlled elements 132, assumed to be all the same x coordinate in the direction across the width of the glass sheet 138 y coordinate in the direction of the glass sheet 138 motion, y=0 at the center of the cooling temperature controlled elements 132

$x_i$ x coordinate value at the center of the $i^{th}$ cooling temperature controlled element 132

$y_i$ y coordinate value at the center of the $i^{th}$ cooling temperature controlled element 132

$\Delta z$ normal distance between the glass sheet 138 and the array of cooling temperature controlled elements 132

A radiation view factor between the $i^{th}$ cooling temperature controlled element 132 and a differential element at location (x, y) on the glass sheet 138 is defined as the fraction of radiative energy leaving the $i^{th}$ cooling temperature controlled element 132 that falls on the differential element of the glass sheet 138. The function $F_i(x,y)$ is defined herein as the radiation view factor between the $i^{th}$ cooling temperature controlled element 132 and a differential element on the glass sheet 138 at (x,y) divided by the area of the differential element. The function $F_i(x,y)$ is given by:

$$F_i(x, y) = \int_{x_i-w_i/2}^{x_i+w_i/2} \int_{y_y-h/2}^{y_i+h/2} \frac{\Delta z^2}{\pi[\Delta z^2 + (x-\eta)^2 + (y-\zeta)^2]^2} d\zeta d\eta$$

The radiation view factor function $F_i(x,y)$ has some illustrative values for a simulation plotted in FIG. 3 where $x_i=0$, $\Delta z=0.200$ m, $w_i=0.025$ m, h=0.1 m. In this plot, line 302 is associated with $F_i(x,0)$, line 304 is associated with $F_i(x,0.1)$, and line 306 is associated with $F_i(x,0.2)$. The coordinates of the x-axis and the y-axis are both in meters.

The radiative heat flux (radiative power per unit area) from the glass sheet 138 to the $i^{th}$ cooling temperature controlled element 132 is given by:

$$q_i(x, y) = \sigma \frac{\varepsilon_s \varepsilon_i (T_s^4 - T_i^4)}{\varepsilon_s + \varepsilon_i - \varepsilon_s \varepsilon_i} F_i(x, y)$$

This flux cools the moving glass sheet 138 whenever the temperature of the glass sheet 138 is greater than the cooling $i^{th}$ cooling temperature controlled element 132. If the temperature of the $i^{th}$ cooling temperature controlled element 132 is higher than that of the glass sheet 138, then the glass sheet 138 will be heated and the $i^{th}$ cooling temperature controlled element 132 should be referred to as a heating element. Here $\sigma$ is the Stefan-Boltzmann constant, $\varepsilon_s$ is the emissivity of the glass sheet 138, $\varepsilon_i$ is the emissivity of the $i^{th}$ cooling temperature controlled element 132, and all surfaces are assumed to be gray bodies for radiation. The total radiative heat flux from any point on the glass sheet 138 is the sum of all the individual cooling element fluxes.

In FIG. 3, it can be seen that the width of the cooling effect of the $i^{th}$ cooling temperature controlled element 132 is much greater than width $w_i$ of the $i^{th}$ cooling temperature controlled element 132. Hence, as the cooling temperature controlled elements 132 are brought closer to the glass sheet 138 this will result in the decrease of the effective width of the cooling effect on the glass sheet 138. However, in many applications such as the fusion process it is not practical to bring the cooling temperature controlled elements 132 close enough to the glass sheet 138 to obtain the required spatial resolution. For example, if a spatial resolution of 50 mm is required, then the cooling temperature controlled elements 132 should be about 30 mm from the glass sheet 138, which as discussed above with respect to the fusion process is undesirably close to the glass sheet 138.

Figure 4:
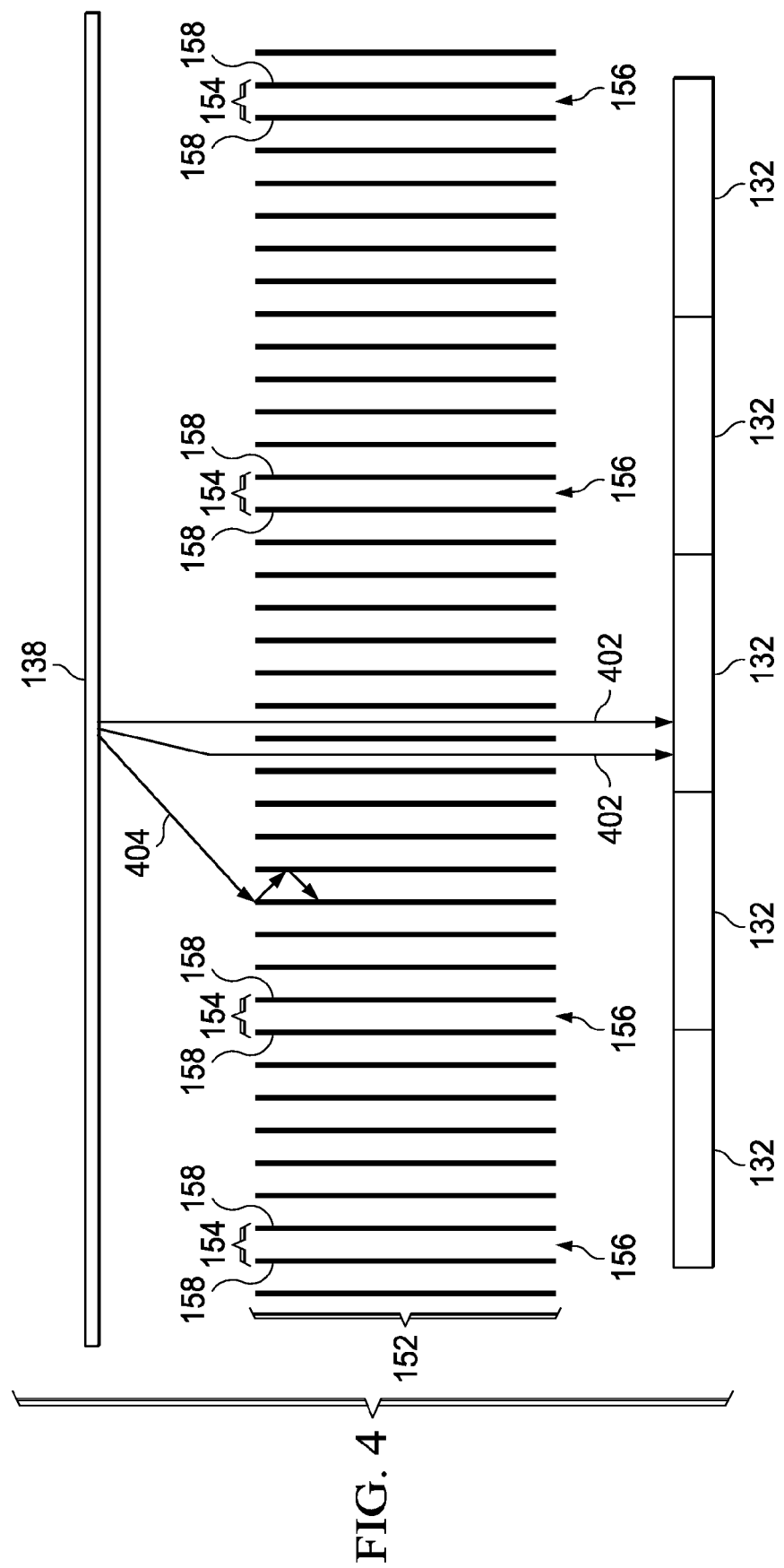
FIG. 4 is a schematic view used to help explain the function of the enhanced temperature control device.

In the present invention, this problem is solved by the addition of the radiation collimator 152 and by the placement of the radiation collimator 152 between the cooling temperature controlled elements 132 and the glass sheet 138. The radiation collimator 152 is used at least in the fusion process to increase the spatial resolution of cooling in the direction perpendicular to movement of the glass sheet 138. So, the discussion herein can be based on infinitely high temperature controlled elements 132 since setting h=∞ in FIG. 3's plot changes the value of the view factor but does not change the shape of its variation with x. Although the analysis herein is done for a radiation collimator 152 and cooling temperature controlled elements 132 with infinite extent in the height or y direction, the radiation collimator 152 and the cooling temperature controlled elements 132 used in the fusion forming application would normally have a finite height extent in the range of about 50-400 mm. FIG. 4 is provided to show how the radiation collimator 152 functions when positioned between the cooling temperature controlled elements 132 and the glass sheet 138.

As shown in FIG. 4, the rays 402 which leave the glass sheet 138 in a normal or close to normal direction will pass directly through the open channels 156 in the radiation collimator 152 before being received by one or more of the cooling temperature controlled elements 132. In contrast, the rays 404 which leave the glass sheet 138 in an oblique direction may be reflected multiple times by the walls 158 of the radiation collimator 152 before eventually reaching the cooling temperature controlled elements 132. Alternatively, the rays 404 leaving the glass sheet 138 obliquely may be absorbed by the radiation collimator 152 so as to heat or cool the walls 158 depending on the process conditions. In any case, the radiation collimator 152 increases the spatial resolution of cooling in the direction perpendicular to movement of the glass sheet 138 which results in a glass sheet 138 that has very little or no bands of retardance (stress).

The size of the radiation collimator 152 is important since a wide spacing of the open channels 156 in the cells 154 reduces its effectiveness at increasing the spatial resolution of the cooling temperature controlled elements 132. In addition, cells 154 which have short walls 158 reduces the effectiveness of the radiation collimator 152 to increase the spatial resolution of the cooling temperature controlled elements 132. However, long and narrow cells 154 have an overall insulating effect so a balance needs to be struck between allowing the cooling while increasing the spatial resolution of the cooling temperature controlled elements 132. To assess this tradeoff, the software package Fluent was used to perform several exemplary simulations the results of which have been shown in FIGS. 5-6.

Referring to FIG. 5, there is a diagram illustrating a Fluent simulation overview which shows temperature contours in ° C. when using 25 mm wide temperature controlled elements 132 and a 1 m wide glass sheet 138 (simulated substrate 138) which is located 401 mm from the temperature controlled element 132 and located 200 mm from the radiation collimator 152. In the simulations, the distance from the radiation collimator 152 to the glass sheet 138 was held constant and the length of the radiation collimator 152 was changed, so the temperature controlled elements 132 were different distances from the glass sheet 138. In this particular simulation, the substrate 238 was at 1100° C. while the temperature controlled elements 132 where at 1100° C. except for the center temperature controlled element 132' which was simulated to be at 1000° C. A detailed discussion about the results of this Fluent simulation is provided next as it relates to the enhancement of the cooling spatial resolution caused by using the radiation collimator 152.

Figure 6:
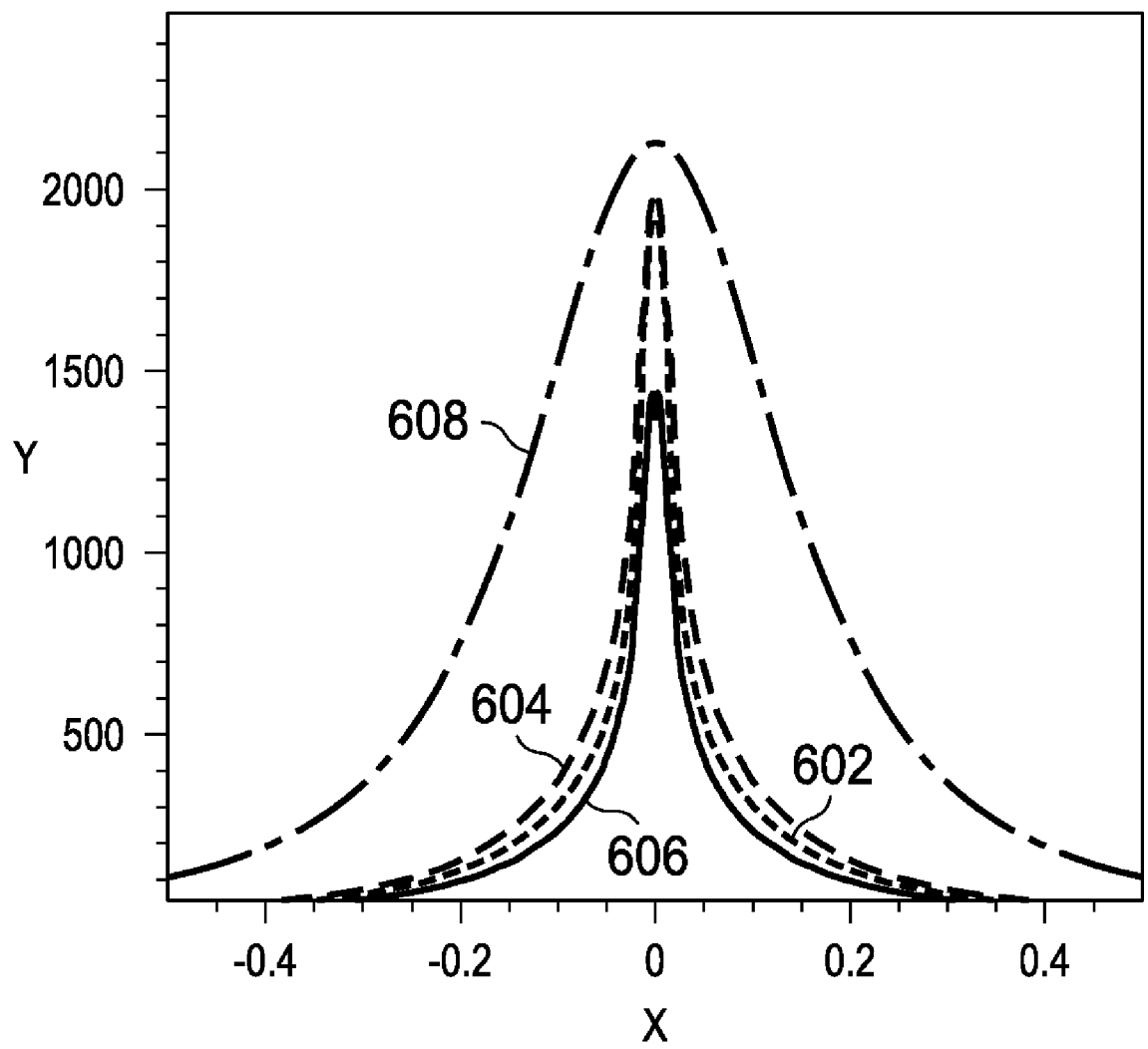

Referring to FIG. 6, there is a graph which illustrates how the presence of the radiation collimator 152 enhances the cooling spatial resolution on the simulated substrate 138. In this graph, the radiative flux from the simulated substrate 138 was plotted for several different geometries of the radiation collimator 152. In particular, the y-axis represents the substrate flux (W/m$^2$), the x-axis represents the spatial distance (meters) on the substrate 138, and several different fluxes based on the different geometries of the radiation collimator 152 are as follows: (1) line 602 represents the flux when the radiation collimator 152 has 1 mm wide open channels 156 and 50 mm long walls 158; (2) line 604 represents the flux when the radiation collimator 152 has 5 mm wide open channels 156 and 100 mm long walls 158; (3) line 606 represents the flux when the radiation collimator 152 has 5 mm wide open channels 156 and 200 mm long walls 158; and (4) line 608 represents the flux when there was no radiation collimator 152. In this simulation, the grid (cells 154) had diffuse properties with emissivity 0.4 and the radiation collimator 152 was spaced 1 mm from the temperature controlled elements 132.

In FIG. 6, the insulating effect and the enhanced cooling spatial resolution of the radiation collimator 152 can be easily seen. From these and other results it appears that a ratio of about 10-50 between the spacing of the open channels 156 and the depth of the walls 158 in the cells 154 of the radiation collimator 152 is a good compromise that allows the desired spatial resolution enhancement without excessive insulation. In addition the data in FIG. 6 indicates that an array of cooling temperature control elements 132 located 200 mm from the substrate 138 with a radiation collimator 152 that has 50 mm deep walls 158 and 1 mm wide cells 154 would have similar spatial resolution to the same cooling temperature controlled elements 132 that are located 30 mm from the substrate 138 with no radiation collimator 152. In this case, there would be an increase in substrate clearance from 30 mm to 200 mm due to the use of the radiation collimator 152. Hence, the radiation collimator 152 allows much higher clearance for the substrate 138 at a given spatial cooling resolution.

The properties of the material used in the radiation collimator 152 would also have an impact on its effectiveness for resolution enhancement and its insulating properties. Generally, the radiation collimator 152 would incorporate materials with lower emissivity which results in less insulation and lower resolution enhancements. However, design simulations could be done with Fluent or other simulation software to determine the optimal material properties and geometry for the radiation collimator 152 depending on the particular application. The simulation results shown herein indicate that desirable properties are easily achieved for applications involving fusion forming of flat glass sheets 132 when the radiation collimator 152 is made from metal foils and extruded ceramic materials which are also especially well suited to glass processing applications.

From the foregoing, one skilled in the art will appreciate that one embodiment of the present invention includes a temperature control device 102 that has an array of heating and/or cooling elements 132 separated from a glass sheet 138 undergoing cooling or heating by a radiation collimator 152 with many straight and open channels 156 in a direction perpendicular to the face of the heating and/or cooling elements 132. For instance, the radiation collimator 152 can have open channels 254 that are similar to an extruded catalytic converter substrate. The radiation collimator 152 enables spatially resolved heating and cooling across a width of the glass sheet 132 at a distance from the heating and cooling elements 132. If desired, the radiation collimator 152 can be used with a variety of heating and cooling elements 132 which have arbitrary numbers and spacing so as long as radiation accounts for a significant portion of the heating or cooling flux with the glass sheet 138.

The discussion herein has been based on using the enhanced temperature control device 102 in an application involving the fusion process to form glass sheets 132. For a more detailed discussion about the fusion process itself reference is made to co-assigned U.S. Pat. Nos. 3,338,696 and 3,682,609 (the contents of these documents are hereby incorporated by reference herein). However, it should be appreciated that the enhanced temperature control device 102 could be used in any process that requires spatially resolved heating and/or cooling of a piece of material where close proximity of the heating and/or cooling elements to the processed material is not desired.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A method for manufacturing a glass sheet, the method comprising the steps of:
melting batch materials to form molten glass;
processing the molten glass to form the glass sheet;
controlling heating or cooling rates across a width of the glass sheet, by adjusting temperatures of a plurality of temperature controlled elements relative to a temperature distribution across the width of the glass sheet, where the controlling step is implemented by a temperature control device which includes:
a controller,
the plurality of temperature controlled elements which are connected to the controller; and
a radiation collimator positioned between the plurality of temperature controlled elements and the glass sheet, wherein the radiation collimator has walls which incorporate materials with a lower emissivity such that oblique rays leaving the glass sheet are reflected by the walls before reaching the plurality of temperature controlled elements, and wherein the controller individually controls the temperature of each of the temperature controlled elements such that a combination of the plurality of temperature controlled elements and the radiation collimator are able to control the temperature distribution across the width of the glass sheet with a desired spatial resolution;
drawing the glass sheet; and
cutting the glass sheet into individual glass sheets.

2. The method of claim 1, wherein the radiation collimator includes a plurality of cells where each cell has an open channel in a substantially perpendicular direction relative to the plurality of temperature controlled elements, and where each cell has walls that are in a substantially parallel direction relative to the movement of the glass sheet.

3. The method of claim 2, wherein at least one of the cells also has walls that are in a substantially perpendicular direction relative to the movement of the glass sheet.

4. The method of claim 2, wherein the controller is configured to control a temperature of each of the temperature controlled elements such that the combination of the radiation collimator and the temperature controlled elements heat or cool different portions of the glass sheet to a desired spatial resolution to reduce stress and control thickness of the glass sheet.

5. The method of claim 2, wherein each cell has the open channel with a space and the walls with a length, where the space and length have been respectively sized according to a ratio of about 10-50.

6. The method of claim 2, wherein the temperature control device further includes a frame which supports the plurality of temperature controlled elements and the radiation collimator.

7. The method of claim 1, wherein the desired spatial resolution is about 75 mm.

8. The method of claim 1, wherein the desired spatial resolution is about 50 mm.

9. The method of claim 1, wherein the desired spatial resolution is about 20 mm.

10. The method of claim 1, wherein the radiation collimator is located at least 50 mm away from the glass sheet.

11. The method of claim 1, wherein the radiation collimator is positioned away from the plurality of temperature controlled elements.

12. A method for manufacturing a glass sheet, the method comprising the steps of:
melting batch materials to form molten glass;
processing the molten glass to form the glass sheet, wherein the glass sheet is subjected to temperature variations that occur in a direction perpendicular to a movement of the glass sheet;
controlling heating or cooling rates across a width of the glass sheet, by adjusting temperatures of a plurality of temperature controlled elements relative to a temperature distribution across the width of the glass sheet, where the temperature control device which includes:
a controller,
the plurality of temperature controlled elements which are connected to the controller; and
a radiation collimator positioned between the plurality of temperature controlled elements and the glass sheet, wherein the controller individually controls a temperature of each of the temperature controlled elements such that a combination of the plurality of temperature controlled elements and the radiation collimator are able to control a temperature distribution across the width of the glass sheet with a desired spatial resolution to substantially cancel adverse affects of the temperature variations and produce the glass sheet which has little to no bands of varying retardance;
drawing the glass sheet; and
cutting the glass sheet into individual glass sheets.

13. The method of claim 12, wherein the radiation collimator is positioned away from the plurality of temperature controlled elements.

14. The method of claim 12, wherein the radiation collimator has walls which incorporate materials with a lower emissivity such that oblique rays leaving the piece of material are reflected by the walls before reaching the plurality of temperature controlled elements.

15. The method of claim 12, wherein the radiation collimator has walls which incorporate materials such that oblique rays leaving the piece of material are absorbed by the walls before reaching the plurality of temperature controlled elements.

16. The method of claim 12, wherein the desired spatial resolution is about 75 mm.

17. The method of claim 12, wherein the desired spatial resolution is about 50 mm.

18. The method of claim 12, wherein the desired spatial resolution is about 20 mm.

19. The method of claim 12, wherein the radiation collimator is located at least 50 mm away from the glass sheet.

* * * * *